United States Patent
Fan et al.

(10) Patent No.: US 7,927,568 B2
(45) Date of Patent: Apr. 19, 2011

(54) METHOD OF AND APPARATUS FOR $CO_2$ CAPTURE IN OXY-COMBUSTION

(75) Inventors: Zhen Fan, Parsippany, NJ (US); Andrew Seltzer, Livingston, NJ (US)

(73) Assignee: Foster Wheeler Energy Corporation, Clinton, NJ (US)

( * ) Notice: Subject to any disclaimer, the term of this patent is extended or adjusted under 35 U.S.C. 154(b) by 1158 days.

(21) Appl. No.: 11/586,690

(22) Filed: Oct. 26, 2006

(65) Prior Publication Data
US 2008/0184880 A1    Aug. 7, 2008

(51) Int. Cl.
*B01D 53/14*    (2006.01)
*F02K 7/02*    (2006.01)
(52) U.S. Cl. .......................... 423/220; 60/649
(58) Field of Classification Search .................... 423/220
See application file for complete search history.

(56) References Cited

U.S. PATENT DOCUMENTS

| | | | |
|---|---|---|---|
| 4,249,915 A * | 2/1981 | Sircar et al. ................. | 95/99 |
| 5,001,902 A | 3/1991 | Garbo ........................ | 60/648 |
| 5,016,599 A | 5/1991 | Jubb | |
| 5,344,627 A | 9/1994 | Fujii et al. | |
| 5,656,064 A * | 8/1997 | Golden et al. ............... | 95/96 |
| 5,665,319 A * | 9/1997 | Hirama et al. ............... | 422/177 |
| 5,724,805 A * | 3/1998 | Golomb et al. .............. | 60/783 |
| 5,974,829 A * | 11/1999 | Novak et al. ................ | 62/617 |
| 6,574,962 B1 | 6/2003 | Hsu .......................... | 60/649 |
| 6,649,028 B2 * | 11/2003 | Sakamoto et al. ............ | 203/98 |
| 6,764,530 B2 | 7/2004 | Iijima | |
| 6,898,936 B1 | 5/2005 | Ochs et al. .................. | 60/649 |
| 7,089,743 B2 * | 8/2006 | Frutschi et al. .............. | 60/772 |
| 7,416,716 B2 * | 8/2008 | Allam et al. ................. | 423/437.1 |

FOREIGN PATENT DOCUMENTS

| | | |
|---|---|---|
| EP | 0 207 620 | 1/1987 |
| EP | 0 551 876 B1 | 5/1996 |
| JP | 2000-337108 A | 12/2000 |
| KR | 1997-011311 B1 | 7/1997 |
| RU | 2 237 172 C1 | 9/2004 |
| WO | 2004/027220 A1 | 4/2004 |

OTHER PUBLICATIONS

International Search Report dated Apr. 21, 2008, which issued in corresponding International Application No. PCT/IB2007/054298, which was published as WO 2008/050289 A3 on May 2, 2008.
Russian Decision on Grant dated Feb. 24, 2010, issued in corresponding Russian patent application No. 2009119744/06(027224).
Korean Office Action dated Mar. 1, 2011, issued in counterpart Korean patent application No. 10-2009-7010521.

* cited by examiner

*Primary Examiner* — Melvin C Mayes
*Assistant Examiner* — Kenneth Vaden
(74) *Attorney, Agent, or Firm* — Fitzpatrick, Cella, Harper & Scinto

(57) ABSTRACT

A method of and an apparatus for capturing $CO_2$ from flue gas emanating from a carbonaceous fuel combusting power plant, which includes a source of oxygen and a combustion chamber for combusting the fuel with oxygen and thereby producing flue gas that includes $CO_2$, water and excess oxygen as its main components. At least a portion of the flue gas is compressed to a pressure higher than about sixty bar, the compressed flue gas is cooled in a primary $CO_2$ separating unit for capturing a first portion of the $CO_2$ by condensing it to produce a liquid $CO_2$ stream and a high pressure vent gas stream that includes oxygen and excess $CO_2$, the liquid $CO_2$ stream is discharged from the power plant, and the high pressure vent gas stream is conducted to a secondary $CO_2$ separating unit for capturing a second portion of the $CO_2$ by adsorbing it to an adsorbing material.

17 Claims, 1 Drawing Sheet

METHOD OF AND APPARATUS FOR $CO_2$ CAPTURE IN OXY-COMBUSTION

BACKGROUND OF THE INVENTION

1. Field of the Invention

The present invention relates to a method of and a system for $CO_2$ capture in oxy-combustion. More particularly, the present invention relates to a two-staged $CO_2$ capturing procedure, which optimizes the $CO_2$ cooling duty and compression power.

2. Description of the Related Art

The flue gases of a conventional power station typically contain from about 4% (by volume) to about 14% carbon dioxide ($CO_2$). It is commonly believed that this $CO_2$ represents a significant factor in increasing the greenhouse effect and global warming. Therefore, there is a clear need for efficient methods of capturing $CO_2$ from flue gases so as to produce a concentrated stream of pressurized $CO_2$ that can readily be transported to a safe storage site or to a further application. $CO_2$ has been captured from gas streams by four main technologies: absorption, where $CO_2$ is selectively absorbed into liquid solvents; membranes, where $CO_2$ is separated by semipermeable plastics or ceramic membranes; adsorption, where $CO_2$ is separated by adsorption on the surfaces of specially designed solid particles; and, low temperature/high pressure processes, where the separation is achieved by condensing the $CO_2$.

At present, the best proven technique to capture $CO_2$ from a flue gas is to scrub the flue gas with an amine solution to absorb $CO_2$ to the solution. This technology has reached the commercial state of operation for $CO_2$ capture systems from small scale flue gases. However, its application decreases considerably the total efficiency of the power plant. Another difficulty is that, in order to minimize contamination of the solvent by impurities, effective measures are needed to clean the flue gas from, for example, sulphur and nitrogen oxides.

Oxy-combustion systems use oxygen, usually produced in an air separation unit (ASU), instead of air, for the combustion of the primary fuel. The oxygen is often mixed with an inert gas, such as recirculated flue gas, in order to keep the combustion temperature at a suitable level. Oxy-combustion processes produce flue gas having $CO_2$, water and $O_2$ as its main constituents, the $CO_2$ concentration being typically greater than about 70% by volume. Therefore, $CO_2$ capture from the flue gas of an oxy-combustion process can be done relatively simply by using refrigerated separation. The water vapor is usually removed from the flue gas of an oxy-combustion process by compressing and cooling the flue gas. Further treatment of the flue gas may be needed to remove air pollutants and non-condensed gases (such as nitrogen) from the flue gas before the $CO_2$ is separated to be sent to storage.

U.S. Pat. No. 6,898,936 discloses an oxy-combustion process with flue gas recirculation, in which a portion of the flue gas is compressed in several steps to a very high pressure of about 345 bar, and cooled to below the critical temperature, 31.05° C. of $CO_2$ to condense the $CO_2$ from the flue gas. The resulting gas stream, which is $O_2$ rich, is expanded back to about 138 bar and conducted to an air separation unit.

U.S. Pat. No. 6,574,962 discloses an oxy-combustion process with flue gas recirculation, in which a portion of the flue gas is cooled in several steps to a very low temperature, ranging from about −51° C. to about −12° C., and compressed to above about 5.8 bar to condense $CO_2$ from the flue gas. The resulting gas stream, rich in $O_2$, is combined with an $O_2$ rich gas stream from an air separation unit and conducted as combustion gas to the combustion furnace.

The above-mentioned prior art solutions are complicated by using either a very high pressure or a very low temperature to capture $CO_2$. Therefore, there still exists a need for a more simple and an economic process to capture $CO_2$ from the flue gas of the oxy-combustion of carbonaceous fuels.

SUMMARY OF THE INVENTION

An object of the present invention is to provide an efficient method of $CO_2$ capture in oxy-combustion.

Another object of the present invention is to provide an efficient system for $CO_2$ capture in oxy-combustion.

According to one aspect, the present invention provides a method of capturing $CO_2$ from flue gas emanating from a carbonaceous fuel combusting power plant, which includes a source of oxygen and a combustion chamber for combusting the fuel with oxygen and thereby producing flue gas comprising $CO_2$, water and excess oxygen as its main components. The method comprises the steps of (a) conducting at least a first portion of the flue gas to a first flue gas channel, (b) compressing the first portion of the flue gas to produce a compressed flue gas stream at a pressure higher than about sixty bar, (c) cooling the compressed flue gas stream in a primary $CO_2$ separating unit for capturing a first portion of the $CO_2$ by condensing it for producing a first liquid $CO_2$ stream and a high pressure vent gas stream comprising oxygen and excess $CO_2$, (d) discharging the first liquid $CO_2$ stream from the power plant, and (e) conducting the high pressure vent gas stream to a secondary $CO_2$ separating unit for capturing a second portion of the $CO_2$ by adsorbing it to an adsorbing material.

According to another aspect, the present invention provides an apparatus for capturing $CO_2$ from flue gas emanating from a carbonaceous fuel combusting power plant having a source of oxygen and a combustion chamber for combusting the fuel with oxygen to thereby produce flue gas, comprising $CO_2$, water and excess oxygen as its main components. The apparatus comprises a first flue gas channel for conducting at least a first portion of the flue gas towards means for capturing $CO_2$, a final compressor arranged in the first flue gas channel for compressing the first portion of the flue gas to produce a compressed flue gas stream at a pressure higher than about sixty bar, final cooling means connected to the first flue gas channel for cooling the compressed flue gas stream for capturing a first portion of the $CO_2$ in a primary $CO_2$ separating unit by condensing it for producing a first liquid $CO_2$ stream and a high pressure vent gas stream comprising oxygen and excess $CO_2$, means for discharging the first liquid $CO_2$ stream from the power plant, and a passage for conducting the high pressure vent gas stream to a secondary $CO_2$ separating unit comprising adsorbing material for capturing a second portion of the $CO_2$ by adsorbing it to the adsorbing material.

When a carbonaceous fuel is combusted in the combustion chamber of a power plant, the produced flue gas is originally at a high temperature, such as typically about 800° C. in the case of a circulating fluidized bed (CFB) boiler. When using oxy-combustion, to the furnace is usually injected, in addition to the oxygen, an inert gas, such as recirculated flue gas, to maintain the combustion temperature at a suitable level. The combustion chamber is normally operated at a pressure close to the ambient pressure, whereby pressure of the flue gas emanating from the furnace is also close to one bar. It is, however, also possible to operate the combustion chamber at an elevated pressure, such as about ten bar, whereby the flue gas is also, correspondingly, originally at an elevated pressure.

The upstream portion of the flue gas channel usually comprises different heat exchangers related to the steam production, such as superheaters, reheaters and economizers, which cause the temperature of the flue gas to be decreased to a lower temperature, such as about 250° C. A first portion of the flue gas downstream of an economizer section is conducted towards means for $CO_2$ capture, and a second portion of the flue gas may be recirculated directly back to the furnace. The present invention relates to a method of and an apparatus for the capture of $CO_2$ from the first portion of the flue gas.

The flue gas usually contains, depending, for example, on the fuel used and on the flue gas recirculation, a relatively high amount of water, typically from about 10% to about 40%. The purpose of the drying step is to efficiently remove the water from the first portion of the flue gas in order to avoid harm that may otherwise be caused by the presence of frozen water (i.e., ice or ice particles) in the downstream stages, which are high in pressure and relatively low in temperature. Preferably, more than about 95%, even more preferably, more than about 99%, of the water originally present in the processed flue gas stream shall be removed.

The drying of the flue gas is usually performed by cooling the flue gas to a suitable temperature to condense the water. Preferably, the drying is performed in two steps, whereby the first cooling step advantageously takes place at the initial flue gas pressure, i.e., typically, at about ambient temperature, and the second cooling step at an elevated pressure of, for example, about sixteen bar. Final drying can then be performed by cooling the pressurized flue gas to a suitable temperature, for example, about 32° C. In some cases, it may be advantageous to perform the drying step solely at one pressure, and in some other cases, it may be advantageous to dry the flue gas in more than two pressure levels. The drying step may advantageously be finalized with chemical de-moisture. Due to moisture-free flue gas, no acid is formed in the downstream stages of the system or in a pipeline for transporting liquid $CO_2$ from the system.

An advantage of oxy-combustion is that the combustion gas introduced to the furnace does not contain $N_2$. Therefore, practically all nitrogen in the furnace comes from the fuel, and the $N_2$ and $NO_X$ levels in the flue gas are relatively low. However, the flue gas may contain conventional amounts of $SO_2$, dust particles and other pollutants. These impurities can be removed from the flue gas by conventional means or, at least a portion of them, can be removed from the flue gas by the condensing water. $SO_2$ (and $SO_3$) remaining in the flue gas entering the primary $CO_2$ separating unit will be condensed therein with the $CO_2$.

By compressing the dry flue gas stream, which now comprises mainly $CO_2$ and some $O_2$, to a high pressure of more than about sixty bar, a first portion of the $CO_2$ in the flue gas can be captured by condensing it at a relatively high temperature, usually close to normal room temperature. By compressing the flue gas to such a high pressure, it is possible to avoid the costs of cooling a large amount of flue gas to refrigerated temperatures, in order to condense the $CO_2$. The flue gas is preferably cooled to a temperature of at least 10° C., even more preferably, to at least 15° C.

On the other hand, in order to avoid the costs associated with excessive compression, the final pressure of the flue gas should be restricted to that needed to condense a desired portion of the $CO_2$ at the temperature obtainable in the final cooling. Thereby, the final pressure is preferably less than about one hundred bar, even more preferably, less than about eighty bar. These final pressures are considerably lower than those described in the U.S. Pat. No. 6,898,936.

The final cooling of the flue gas is preferably performed by using a heat exchanger with a cooling agent, normally water. A suitable cooling agent, such as river water, may be readily available at the site of the power plant. The cooling agent may alternatively be recirculated water, which may advantageously be recooled by recirculating it through a cooling tower. The captured first portion of $CO_2$ comprises preferably at least about 60%, even more preferably, at least about 80%, by weight, of the $CO_2$ in the flue gas stream. The first $CO_2$ capturing step thus produces a first liquid $CO_2$ stream and a high pressure vent gas stream comprising oxygen and excess $CO_2$.

According to a preferred embodiment of the present invention, the primary $CO_2$ separating unit comprises a rectifying column for producing the first liquid $CO_2$ stream and a high pressure vent gas stream comprising oxygen and excess $CO_2$. By using a rectifying column with a suitable number of stages, having, advantageously, a condenser and a reflux line for the top flux and a reboiler for the liquid bottom flux, it is possible to provide a high purity liquid $CO_2$ stream, regardless of, e.g., possible impurities in the $O_2$ stream from the oxygen source or leaks in the combustion system.

In trying to capture as much of the $CO_2$ in the flue gas as possible, the difficulties related to compressing to very high pressures and/or cooling to very low temperatures are, according to the present invention, avoided, by capturing a second portion of $CO_2$ in a secondary $CO_2$ separating unit by adsorbing a portion of the excess $CO_2$ from the vent gas stream to an adsorbing material. Preferably, at least about 60%, even more preferably, at least about 90%, by weight, of the excess $CO_2$, is adsorbed in the secondary $CO_2$ separating unit.

According to a preferred embodiment of the present invention, the secondary $CO_2$ separating unit is based on temperature swing adsorption (TSA), i.e., the adsorbed $CO_2$ is at a later stage released from the adsorbing material by heating the material. The released $CO_2$ is advantageously condensed by recooling it in a heat exchanger. Due to the use of TSA instead of PSA (pressure swing adsorption), the pressure of the $CO_2$ is maintained, and the condensed $CO_2$, i.e., a second liquid $CO_2$ stream, can advantageously be combined with the first liquid $CO_2$ stream from the primary $CO_2$ separating unit. The combined liquid $CO_2$ stream is then advantageously pumped to a suitable pressure, ranging typically from about one hundred bar to about one hundred sixty bar for transporting the liquid $CO_2$ to a storage site or to a further application.

According to a preferred embodiment of the present invention, the method comprises a further step of expanding at least a portion of the high pressure vent gas stream through a turbine for producing power and an expanded vent gas stream. By the use of the turbine, it is possible to improve the total efficiency of the power plant. The vent gas stream, which typically contains a high amount of oxygen, is advantageously expanded to a pressure suitable for an input gas to an air separating unit, and at least a portion of the expanded vent gas stream is conducted to an air separating unit, as an advantageous oxygen rich input gas.

The above brief description, as well as further objects, features, and advantages of the present invention will be more fully appreciated by reference to the following detailed description of the currently preferred, but nonetheless illustrative, embodiments of the present invention, taken in conjunction with the accompanying drawing.

DETAILED DESCRIPTION OF THE INVENTION

Figure 1:
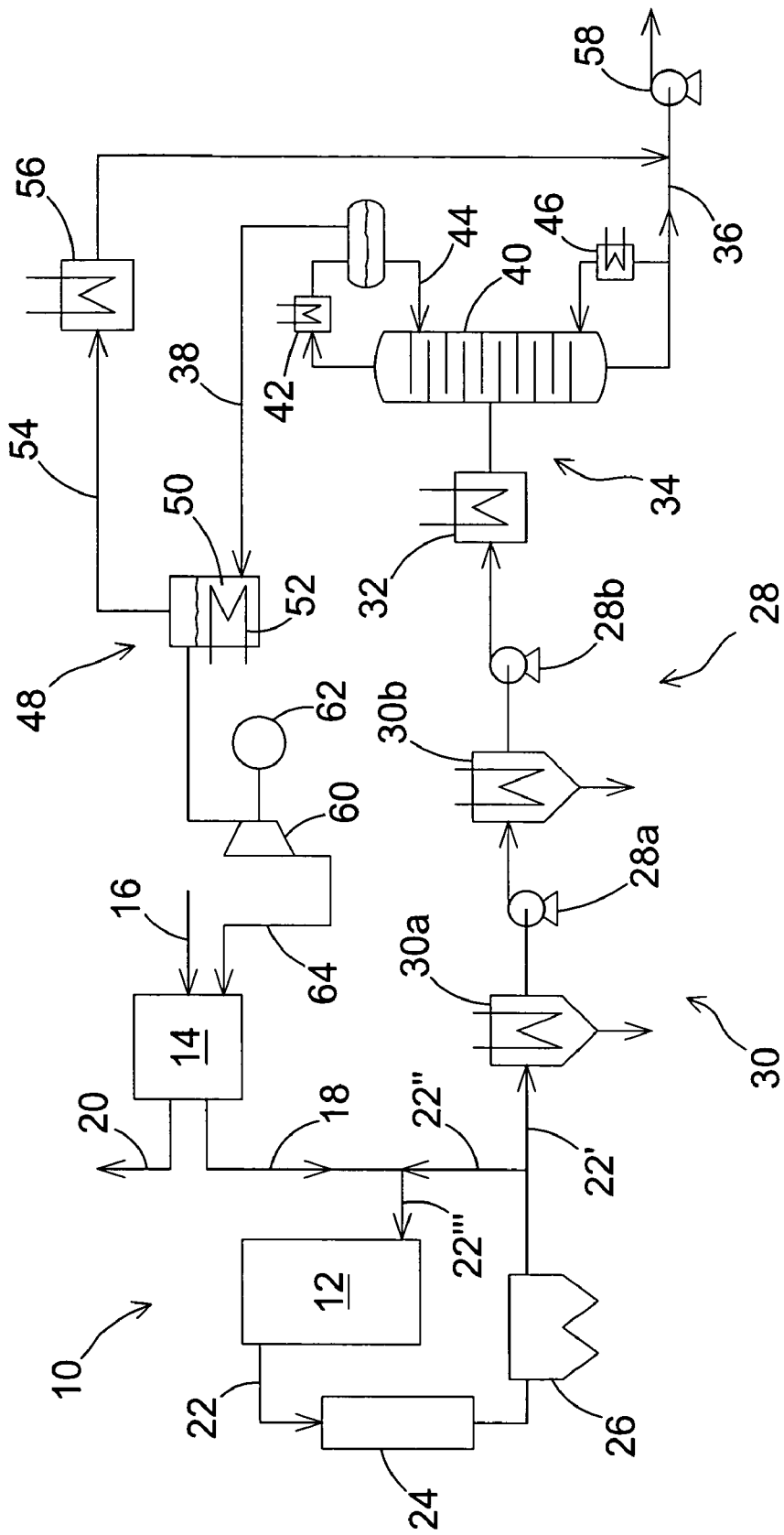
FIG. 1 is a schematic diagram of a power plant having an apparatus for capturing $CO_2$ in accordance with a preferred embodiment of the present invention.

FIG. 1 discloses schematically a power plant with an exemplary embodiment of the present invention. Thus, FIG. 1 shows a power plant 10, comprising a combustor 12 for combusting carbonaceous fuel with oxygen conducted to the combustor 12 from an air separation unit 14. The combustion process produces a flue gas stream comprising a high amount, for example, about 75%, of $CO_2$ and having water and excess oxygen as its other main components. The combustor 12 may be a CFB boiler, a PC boiler, or some other suitable type of a combustor. The combustor 12 may be operated at about the ambient temperature or it may alternatively be of a type operated at an elevated pressure, for example, about ten bar.

The air separation unit 14 converts an incoming stream of air 16 to a first stream 18 comprising mainly oxygen, and another stream, nitrogen rich stream 20. According to the present invention, at least a portion of the oxygen rich stream 18 is conducted to the combustor 12, and the nitrogen rich stream 20 is let to the atmosphere or it is conducted to another application.

The flue gas produced in combusting carbonaceous fuel in the furnace of the combustor 12 is conducted to a flue gas channel 22. The flue gas channel may comprise conventional apparatuses 24, 26 for producing steam, such as superheaters, reheaters and economizers, and for capturing emissions, especially, dust particles and $SO_2$. However, because such apparatuses are not essential to the present invention, their details are not described here.

A portion of the flue gas may be recirculated via a recirculation channel 22" back to the furnace of the combustor 12 through recirculation feed 22''', in order to keep the furnace temperature at a desired level. The remaining portion of the flue gas, which from now on is called a first portion of the flue gas, is conducted towards means for $CO_2$ capture via a channel 22', which is a so-called first flue gas channel. The branch point of the flue gas stream portions may be located downstream of a dust separator 26, as in FIG. 1, or in another suitable position in the flue gas channel 22. The recirculation channel 22"—also called a second flue gas channel—and/or the first flue gas channel 22', may advantageously comprise means for controlling the flue gas flow rate, for example, dampers, control valves or other flow restrictors, which, however, are not shown in FIG. 1.

The flue gas may contain a relatively high amount of water, typically, from about 10% to about 40%. The water is advantageously efficiently removed from the flue gas prior to the $CO_2$ capture, in order to avoid harm that may otherwise be caused by the presence of frozen water (i.e., ice or ice particles) in the downstream stages. Preferably, more than 95%, even more preferably, more than 99%, of the water originally in the second flue gas stream shall be removed.

According to the present invention, the first flue gas channel 22' comprises a compressor system 28 for compressing the first portion of the flue gas and a water separator 30 for removing water, in order to produce a dry and compressed flue gas stream at a pressure of more than about sixty bar. In FIG. 1, the compressor system 28 comprises two compressors 28a, 28b, but, in practice, there would normally be about three to four compressors connected in series, in order to obtain the required final pressure. An intermediate heat exchanger, such as a heat exchanger 30b in FIG. 1, is normally provided between each pair of compressors, to provide intermediate cooling for the flue gas stream.

The drying of the flue gas is usually performed by cooling the flue gas to a suitable temperature to condense the water. Preferably, the drying is performed in at least two steps, whereby a first heat exchanger 30a is advantageously arranged into the first flue gas channel at the initial flue gas pressure, i.e., typically at about ambient temperature, and the second heat exchanger 30b at an elevated pressure of, for example, about sixteen bar. Efficient drying can thus be performed by cooling the pressurized flue gas to a suitable temperature, for example, to about 32° C. The drying step can advantageously be finalized by chemical de-moisture. Due to moisture-free flue gas, no acid is formed in the downstream stages of the system or in the pipeline for transporting liquid $CO_2$ from the system.

The dried and compressed flue gas stream is conducted to a primary $CO_2$ separating unit 34 for producing a first liquid $CO_2$ stream 36 and a high pressure vent gas stream 38 comprising oxygen and excess $CO_2$. Because the dry flue gas stream, comprising mainly $CO_2$ and some $O_2$, is compressed to a pressure of more than sixty bar, a first portion of the $CO_2$ in the flue gas can be captured by condensing it at a relatively high temperature, preferably, close to normal room temperature. The flue gas is thus preferably cooled to a temperature of at least about 10° C., even more preferably, it is cooled to a temperature of at least about 15° C. These final temperatures are considerably higher than those described, e.g., in U.S. Pat. No. 6,574,962.

The cooling of the flue gas is preferably performed by means of a heat exchanger 32 using cooling water or other suitable cooling agent. The cooling water may be any suitable water from outside, such as sea or river water, or recycled water, which may advantageously be recooled by recirculating it through a cooling tower. The captured first portion of $CO_2$ comprises preferably at least about 60%, even more preferably, at least about 80%, by weight of the $CO_2$ in the first portion of the flue gas. The first $CO_2$ capturing step thus produces a first liquid $CO_2$ stream 36 and a high pressure vent gas stream 38 comprising oxygen and excess $CO_2$.

The primary $CO_2$ separating unit 34 may advantageously comprise a rectifying column 40 for producing the liquid $CO_2$ stream 36 and the high pressure vent gas stream 38. By using a rectifying column 40 with a suitable number of stages, and having advantageously a condenser 42 and a reflux line 44 for the top flux and a reboiler 46 for the liquid bottom flux, it is possible obtain a low $CO_2$ vent gas stream 38 and a high purity liquid $CO_2$ stream 36. The rectifying column 34 may, for example, be a packed tower with ten stages and a reflux ratio of 0.25.

In order to capture as much of the $CO_2$ in the flue gas as possible, the vent gas stream 38 from primary $CO_2$ separating unit 34 is, according to the present invention, conducted to a secondary $CO_2$ separating unit 48. The secondary $CO_2$ separating unit 48 comprises, advantageously, a bed 50 of adsorbing material for adsorbing excess $CO_2$ from the vent gas stream 38. The adsorbing material bed 50 may comprise activated carbon, zeolites or other suitable materials. The difficulties related to compressing to very high pressures and/or cooling to very low temperatures, as known in the prior art technologies, are avoided by performing the final $CO_2$ capturing in the adsorbing bed 50. Preferably, at least about 60%, even more preferably, at least about 90%, by weight of the excess $CO_2$ is adsorbed in the secondary $CO_2$ separating unit. Thereby, the total $CO_2$ removal is advantageously more than 99%.

According to a preferred embodiment of the present invention, the secondary $CO_2$ separating unit 48 is based on temperature swing adsorption (TSA), i.e., that adsorbed material is at a later stage released from the bed by increasing its temperature. Advantageously, the TSA unit 48 comprises at least two adsorption beds 50, which can be used alternatively. It is also possible to use continuously a staged adsorption bed 50, so as to make it possible to release $CO_2$ from a portion of the bed material, by heating the bed with a heat exchanger 52, while another portion of the bed material is adsorbing more $CO_2$.

The released $CO_2$ 54 is advantageously condensed by recooling it in a heat exchanger 56. The condensed $CO_2$, i.e., the second liquid $CO_2$ stream, is advantageously combined with the first liquid $CO_2$ stream 36 produced in the primary $CO_2$ separating unit 34. The combined liquid $CO_2$ stream is then advantageously pumped with a pump 58 to a suitable pressure, ranging, typically, from about one hundred bar to about one hundred sixty bar, for transporting the $CO_2$ to a storage site or to a further application.

According to a preferred embodiment of the present invention, the method comprises a further step of expanding at least a portion of the vent gas stream from the TSA unit 48 through a turbine 60, for advantageously producing power with a generator 62, and an expanded vent gas stream 64. Typically, the vent gas stream 64 comprises at least about 50 to about 70% $O_2$, the rest being mainly $CO_2$ and $N_2$, thus providing an advantageous input gas to be input to the air separating unit 14. Therefore, at least a portion of the expanded vent gas stream is advantageously conducted to the air separating unit 14 as additional input gas.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

We claim:

1. A method of capturing $CO_2$ from flue gas emanating from a carbonaceous fuel combusting power plant, which includes a source of oxygen and a combustion chamber for combusting the carbonaceous fuel with oxygen and thereby producing flue gas comprising $CO_2$, water and excess oxygen as its main components, the method comprising the steps of:
    (a) conducting at least a first portion of the flue gas to a first flue gas channel;
    (b) compressing the first portion of the flue gas for producing a compressed flue gas stream at a pressure less than about one hundred bar;
    (c) cooling the compressed flue gas stream in a primary $CO_2$ separating unit to a temperature of at least 10° C., for capturing a first portion of the $CO_2$ by condensing the first portion to produce a first liquid $CO_2$ stream and a high pressure vent gas stream comprising oxygen and excess $CO_2$;
    (d) discharging the first liquid $CO_2$ stream from the power plant; and
    (e) conducting the high pressure vent gas stream to a secondary $CO_2$ separating unit for capturing a second portion of the $CO_2$ by adsorbing it to an adsorbing material.

2. The method according to claim 1, further comprising, prior to (step c), a further step of removing water from the first portion of the flue gas.

3. The method according to claim 2, wherein the step of removing water is performed by compressing and/or cooling the first portion of the flue gas to a pressure and temperature sufficient for condensing more than about 99% by weight of water in the portion of the flue gas stream.

4. The method according to claim 1, wherein the first portion of the $CO_2$ comprises at least about 60% by weight of $CO_2$ in the compressed flue gas stream.

5. The method according to claim 4, wherein the first portion of the $CO_2$ comprises at least about 80% by weight of the $CO_2$ in the compressed flue gas stream.

6. The method according to claim 1, wherein the second portion of the $CO_2$ comprises at least about 60% by weight of the excess $CO_2$.

7. The method according to claim 6, wherein the second portion of the $CO_2$ comprises at least about 90% by weight of the excess $CO_2$.

8. The method according to claim 1, further comprising step (f) of releasing, in step (e), by heat, adsorbed $CO_2$ from the adsorbing material, recooling the released $CO_2$ for producing a second liquid $CO_2$ stream and combining at least a portion of the second liquid $CO_2$ stream to the first liquid $CO_2$ stream.

9. The method according to claim 8, further comprising step (g) of pumping the first liquid $CO_2$ stream to a pressure from about one hundred bar to about one hundred sixty bar for transporting the liquid $CO_2$ stream to a storage site or to a further application.

10. The method according to claim 1, wherein the compressed flue gas stream in step (c) is cooled to a temperature of at least 16° C.

11. The method according to claim 10, wherein the cooling step is performed by using a recirculating cooling agent, which is recooled in a cooling tower.

12. The method according to claim 1, wherein the cooling step is performed by using a recirculating cooling agent, which is recooled in a cooling tower.

13. The method according to claim 1, wherein the primary $CO_2$ separating unit comprises a rectifying column.

14. The method according to claim 1, further comprising step (f) of pumping the first liquid $CO_2$ stream to a pressure from about one hundred bar to about one hundred sixty bar for transporting the liquid $CO_2$ stream to a storage site or to a further application.

15. The method according to claim 1, further comprising step (f) of expanding at least a portion of the vent gas stream through a turbine for producing power and an expanded vent gas stream.

16. The method according to claim 15, wherein the source of oxygen is an air separating unit and further comprising step (g) of conducting at least a portion of the expanded vent gas stream to the air separating unit.

17. The method according to claim 1, further comprising step (f) of recirculating a second portion of the flue gas through a second flue gas channel to the combustion chamber.

* * * * *